United States Patent
Ku et al.

(10) Patent No.: US 8,712,099 B2
(45) Date of Patent: Apr. 29, 2014

(54) IMAGE SURVEILLANCE SYSTEM AND METHOD OF DETECTING WHETHER OBJECT IS LEFT BEHIND OR TAKEN AWAY

(75) Inventors: Ja-yeong Ku, Changwon (KR); Jeong-eun Lim, Changwon (KR); Ji-man Kim, Pohang-si (KR); Dai-jin Kim, Pohang-si (KR)

(73) Assignees: Samsung Techwin Co., Ltd., Changwon (KR); Postech Academy-Industry Foundation, Pohang-si (KR)

( * ) Notice: Subject to any disclaimer, the term of this patent is extended or adjusted under 35 U.S.C. 154(b) by 158 days.

(21) Appl. No.: 13/351,642

(22) Filed: Jan. 17, 2012

(65) Prior Publication Data
US 2012/0183177 A1    Jul. 19, 2012

(30) Foreign Application Priority Data
Jan. 17, 2011    (KR) .................. 10-2011-0004538

(51) Int. Cl.
*G06K 9/00*    (2006.01)
(52) U.S. Cl.
USPC ........................................ 382/103
(58) Field of Classification Search
USPC ................. 382/100–103; 348/169–171
See application file for complete search history.

(56) References Cited

U.S. PATENT DOCUMENTS

| 7,382,898 | B2 | 6/2008 | Aggarwal et al. | |
| 7,813,528 | B2 | 10/2010 | Porikli et al. | |
| 2006/0002586 | A1* | 1/2006 | Aggarwal et al. | 382/103 |
| 2009/0067716 | A1* | 3/2009 | Brown et al. | 382/173 |
| 2011/0081043 | A1* | 4/2011 | Sabol et al. | 382/103 |
| 2012/0027248 | A1* | 2/2012 | Feris et al. | 382/103 |

FOREIGN PATENT DOCUMENTS

| KR | 100685134 B1 | 2/2007 |
| KR | 1020080036512 A | 4/2008 |
| KR | 1020090044957 A | 5/2009 |

OTHER PUBLICATIONS

Communication dated Apr. 23, 2012 issued by the Korean Intellectual Property Office in corresponding Korean Application No. 10-2011-0004538.
Jaekeun Park, "Study on Development of Intelligent Video Surveillance System", Dec. 30, 2008; 11 pages total.

* cited by examiner

*Primary Examiner* — Atiba O Fitzpatrick
(74) *Attorney, Agent, or Firm* — Sughrue Mion, PLLC (57) ABSTRACT

An image surveillance system and a method of detecting whether an object is left behind or taken away are provided. The image surveillance system includes: a foreground detecting unit which detects a foreground region based on a pixel information difference between a background image and a current input image; a still region detecting unit which detects a candidate still region by clustering foreground pixels of the foreground region, and determines whether the candidate still region is a falsely detected still region or a true still region; and an object detecting unit which determines whether an object is left behind or taken away, based on edge information about the true still region.

18 Claims, 9 Drawing Sheets

BACKGROUND MODEL
BY COUNTING

BEFORE SHADOW IS REMOVED

FIG. 6C

AFTER SHADOW IS REMOVED

LBP = 1+2+4+8+128 = 143

IMAGE SURVEILLANCE SYSTEM AND METHOD OF DETECTING WHETHER OBJECT IS LEFT BEHIND OR TAKEN AWAY

CROSS-REFERENCE TO RELATED PATENT APPLICATION

This application claims priority from Korean Patent Application No. 10-2011-0004538, filed on Jan. 17, 2011 in the Korean Intellectual Property Office, the disclosure of which is incorporated herein in its entirety by reference.

BACKGROUND

1. Field

Apparatuses and methods consistent with exemplary embodiments relate to image surveillance to detect an object that is left behind or taken away by analyzing an input image obtained by a fixed camera.

2. Description of the Related Art

Research has been conducted into technologies that model a background and detect a region of an object by using a fixed camera as used in surveillance systems. In addition, as dangers of terrorism to public facilities have increased, there is a need to develop a surveillance system for detecting these dangers.

Related art methods of detecting an object that does not move for a predetermined period of time after being left behind, or an object that has been taken away for a predetermined period of time could be used in an environment such as in predetermined level of lighting and when the number of other moving objects is limited. As an environment in which the related art methods are used becomes more complex, performance of the related art methods may be remarkably reduced. A level of complexity of environment may be determined according to the number f moving objects in a given area, a change in lighting and weather, and presence of noise. These related art methods have problems in terms of failing to detect an object that are left behind or taken away, or in terms of raising many false alarms in a complex environment where a change in lighting occurs and many other objects move.

SUMMARY

One or more exemplary embodiments provide methods and systems for detecting an object that is left behind or taken away even in a complex environment.

According to an aspect of an exemplary embodiment, there is provided an image surveillance system which may include: a foreground detecting unit which detects a foreground region based on a pixel information difference between a background image and a current input image; a still region detecting unit which detects a candidate still region by clustering foreground pixels of the foreground region, and determines whether the candidate still region is a falsely detected still region or a true still region; and an object detecting unit which determines whether an object is left behind or taken away, based on edge information about the true still region.

The still region detecting unit may include: a candidate still region detecting unit which sets, as one of still pixels, a pixel which is detected as the foreground pixel for a predetermined period of time, and clusters the still pixels to detect the candidate still region; and a false-detection determining unit which determines whether the candidate still region satisfies at least one of a plurality of conditions for determining whether the candidate still region is falsely detected, wherein the plurality of conditions use at least one of an area of the foreground region with respect to an area of the candidate still region, variance of the area of the foreground region in the predetermined period of time, variance in a coordinate of the foreground region, a sustained time period for which the candidate still region is detected as the candidate still region, the size of the candidate still region, a motion of the candidate still region, darkness change of the candidate still region, and a relationship between an average pixel value of the candidate still region and an average pixel value of a background region of the background image corresponding to the candidate still region, and wherein the still region detecting unit determines the candidate still region as the true still region if the candidate still region satisfies the at least one of the plurality of conditions.

The information about the candidate still region may include coordinates of top left and bottom right pixels of the candidate still region, the size of the candidate still region, the average pixel value of the candidate still region, the average pixel value of the background region corresponding to the candidate still region, and the sustained time period for which the candidate still region is detected as the candidate still region, and wherein the candidate still region of the current input image is updated based on a candidate still region of a previous input image.

The false-detection determining unit may apply a local binary pattern (LBP) remove a falsely detected still region due to a change in darkness.

If a difference in the average pixel values between the candidate still region and the background region is equal to or greater than a second threshold value, the candidate still region is determined as the true still region.

The object detecting unit may include: a boundary region extracting unit which performs an exclusive logic sum (XOR) calculation on a dilation region generated by dilating the true still region and a reversed erosion region generated by eroding and reversing the true still region to extract a boundary region of the true still region in the current input image; an edge extracting unit which extracts edge information about the boundary region of the true still region in the current input image and edge information about a boundary region of the background image in a previous input image; and a determining unit which detects whether the object is left behind or taken away based on a change between an edge intensity of the true still region in the current input image and an edge intensity of the background image in the previous input image.

The object detecting unit determines that the object is left behind if an edge intensity of the true still region in the current input image increases compared to an edge intensity of the background image in a previous input image, and wherein the determining unit determines that the object is taken away if the edge intensity of the true still region in the current input image decreases compared to the edge intensity of the background image in the previous input image.

According to an aspect another exemplary embodiment, there is provided a method of detecting whether an object is left behind or taken away in an image surveillance system. The method may include: detecting a foreground region based on a pixel information difference between a background image and a current, input image; detecting a candidate still region by clustering foreground pixels of the foreground region, and determining whether the candidate still region is a falsely detected still region or a true still region; and determining whether an object is left behind or taken away, based on edge information about the true still region.

The detecting the foreground region may include: obtaining and storing pixel values for respective pixels in a predetermined number of image frames, generating the background image by using a pixel value which is obtained most frequently with respect to each of the pixels from among the stored pixel values, and updating the background image using the predetermined number of image frames; determining, as one of the foreground pixels, a pixel of which a pixel value difference between the background image and the current input image is equal to or greater than a first threshold value; and removing a shadow pixel from the foreground pixels, based on hue and brightness information about the foreground pixels.

The determining whether the object is left behind or taken away may include: setting, as one of still pixels, a pixel which is detected as the foreground pixel for a predetermined period of time; clustering the still pixels to detect the candidate still region; and determining whether the candidate still region satisfies at least one of a plurality of conditions for determining whether the candidate still region is falsely detected, wherein the plurality of conditions use at least one of an area of the foreground region with respect to an area of the candidate still region, variance of the area of the foreground region in the predetermined period of time, variance in a coordinate of the foreground region, a sustained time period for which the candidate still region is detected as the candidate still region, the size of the candidate still region, a motion of the candidate still region, darkness change of the candidate still region, and a relationship between an average pixel value of the candidate still region and an average pixel value of a background region of the background image corresponding to the candidate still region, and wherein the candidate still region is determined as the true still region if the candidate still region satisfies the at least one of the plurality of conditions.

The information about the candidate still region may include coordinates of top left and bottom right pixels of the candidate still region, the size of the candidate still region, the average pixel value of the candidate still region, the average pixel value of the background region corresponding to the candidate still region, and the sustained time period for which the candidate still region is detected as the candidate still region, and wherein the candidate still region of the current input image is updated based on a candidate still region of a previous input image.

The method may include applying a local binary pattern (LBP) to remove a falsely detected still region according to a change in darkness.

If a difference in the average pixel values between the candidate still region and the background region is equal to or greater than a second threshold value, the candidate still region is determined as the true still region.

The determining whether the object that is left behind or taken away may include: performing an exclusive logic sum (XOR) calculation on a dilation region generated by dilating the true still region and a reversed erosion region generated by eroding and reversing the true still region to extract a boundary region of the true still region; extracting edge information about the boundary region of the true still region in the current image and edge information about a boundary region of the background image in a previous input image; and detecting whether the object is left behind or taken away based on a change between an edge intensity of the true still region in the current input image and an edge intensity of the background image in the previous input image.

The determining whether the object is left behind or taken away may include: determining that the object is left behind if an edge intensity of the true still region in the current input image increases compared to an edge intensity of the background image in a previous input image; and determining that the object is taken away if the edge intensity of the true still region in the current input image decreases compared to the edge intensity of the background image in the previous input image.

BRIEF DESCRIPTION OF THE DRAWINGS

The above and other aspects will become more apparent by describing in detail exemplary embodiments with reference to the attached drawings, in which.

DETAILED DESCRIPTION OF EXEMPLARY EMBODIMENTS

Hereinafter, the exemplary embodiments will be described with reference to the attached drawings.

Figure 1:
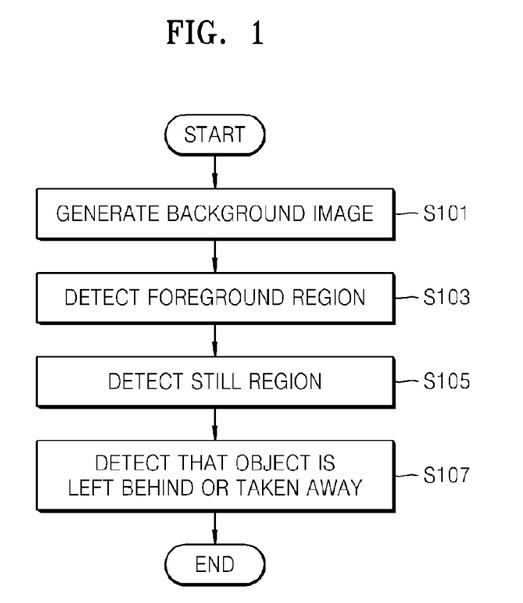
FIGS. 1 and 2A-2D are a flowchart and a set of images for explaining a method of detecting an object that is left behind or taken away in an image surveillance system, according to an exemplary embodiment.

FIGS. 1 and 2 are respectively a flowchart and a set of images for explaining a method of detecting an object that is left behind or taken away in an image surveillance system, according to an exemplary embodiment.

Figure 2A:
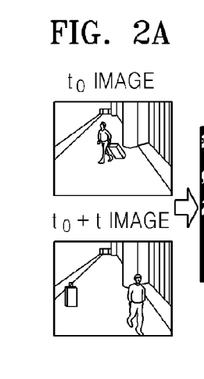
Figure 2B:
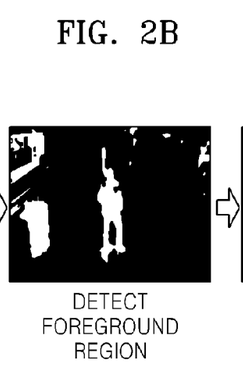
Figure 2C:
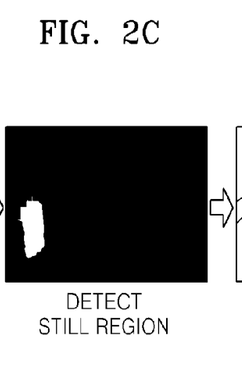
Figure 2D:
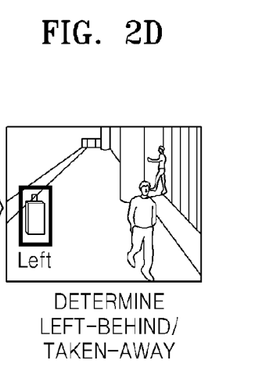

Referring to FIGS. 1 and 2, the method according to the present exemplary embodiment includes generating a background image and detecting a foreground region by using color information of input images (FIGS. 2A and 2B), detecting a still region based on the foreground region (FIG. 2C), and determining whether an object is taken away or left behind by extracting edge information (FIG. 2D).

The image surveillance system generates the background image by using RGB color images of a predetermined number of input images (operation S101).

The image surveillance system detects the foreground region by using an RGB color information difference between the background image and a current input image (operation S103).

The image surveillance system detects the still region which satisfies a predetermined condition, from the foreground region (operation S105). The image surveillance system determines a true still region by clustering foreground pixels of the foreground region to detect candidate still regions and determining whether the candidate still regions are falsely detected.

The image surveillance system determines whether the object is taken away or left behind by analyzing a change in development of the edge information extracted from the still region (operation S107).

Figure 3:
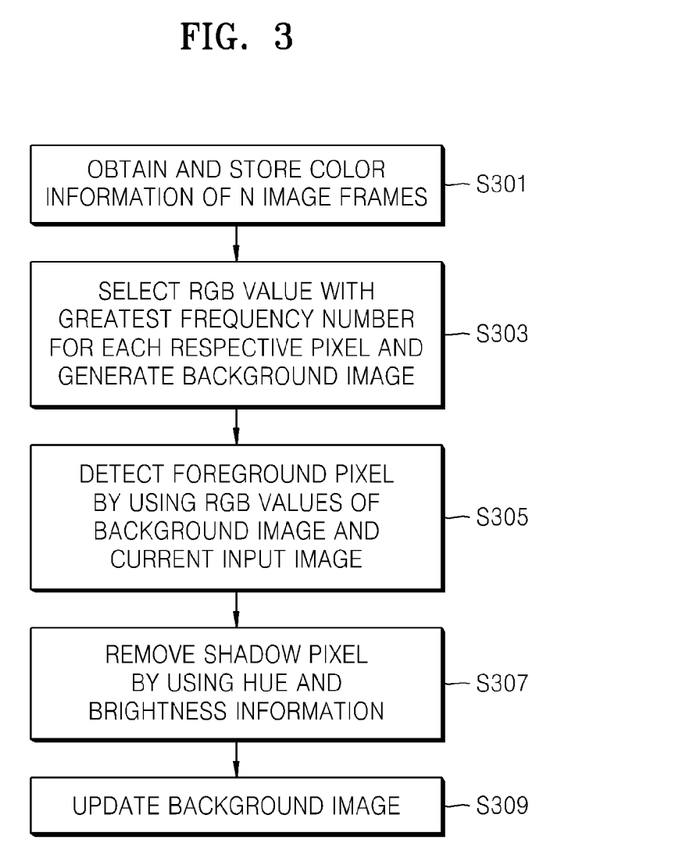
FIG. 3 is a flowchart of the operations of FIG. 1 of generating a background image and detecting a foreground region, according to an exemplary embodiment.
Figure 4A:
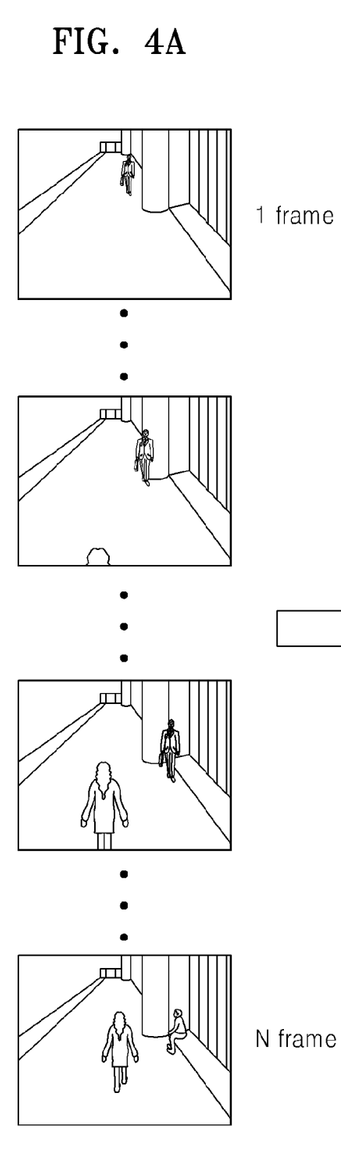
FIGS. 4A and 4B show a set of images for explaining an operation of generating a background image, according to an exemplary embodiment.
Figure 4B:
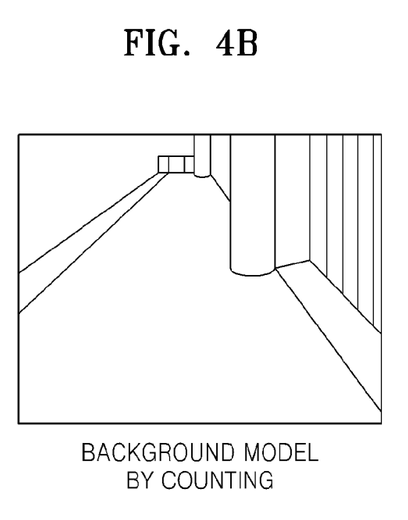
Figure 5:
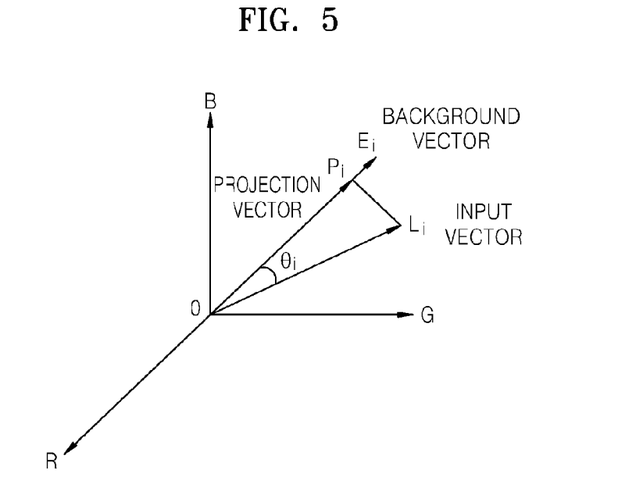
FIG. 5 is a graph for explaining a method of removing a shadow from a foreground region, according to an exemplary embodiment.
Figure 6A:
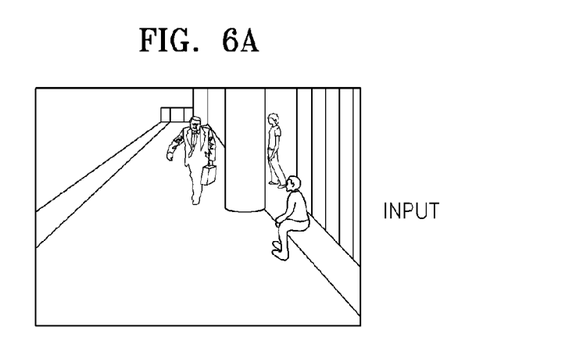
FIGS. 6A through 6C show a set of images for explaining a method of removing a shadow, according to an exemplary embodiment.
Figure 6B:
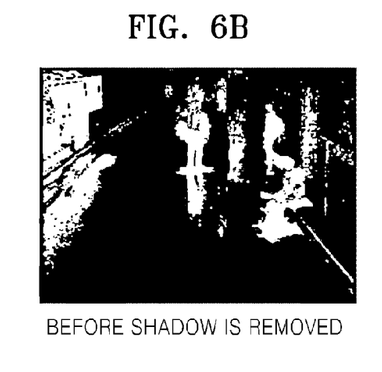
Figure 6C:
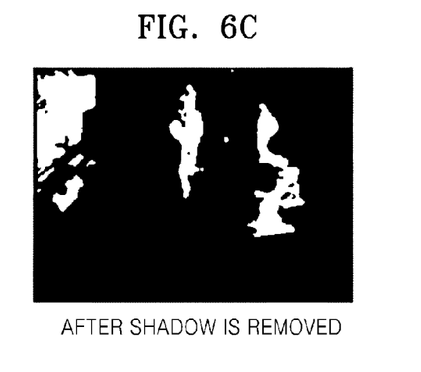

FIG. 3 is a flowchart of the operations of FIG. 1 of generating the background image and detecting the foreground region, according to an exemplary embodiment. FIGS. 4A and 4B show a set of images for explaining an operation of generating a background image, according to an exemplary embodiment. FIG. 5 is a graph for explaining a method of removing a shadow from a foreground region, according to an exemplary embodiment. FIGS. 6A through 6C show a set of images for explaining a method of removing a shadow, according to an exemplary embodiment.

The image surveillance system obtains and stores color information, for example, RGB values which are RGB, intensities, for respective pixels of a predetermined number of image frames (1 through N frames), as shown in FIG. 4A (operation S301).

The image surveillance system selects an RGB value of a highest frequency number (that is an RGB value which is obtained most frequently) from among the RGB values that are stored, with respect to respective pixels, and generates the background image based on these RGB values that are selected for respective pixels (operation S303). For example, a frequency number of an RGB value of 0 to 255 is counted with respect to a pixel A(x, y). When a frequency number of an RGB value of 255 is the highest with respect to a pixel A(x, y), 255 is selected with respect to a pixel A(x, y). Equation (1) below shows a pixel B(x, y) of a position (x, y) in the background image. Here, $CI(x, y)$ is a frequency number of an RGB value 'I' with respect to a pixel (x, y).

$$B(x, y)_{R,G,B} = \mathrm{argmax}_I c_I(x, y)\Big|_{R,G,B} \quad (1)$$

$$I = 0, \ldots, 255$$

According to an exemplary embodiment, an image of a target area is obtained in an image sequence to generate the background image, and an RGB information cumulative counting method is used for each respective pixel. Thus, as shown in FIG. 4B, moving objects that appear and pass for a sufficient period of time (for a predetermined number of frames) are considered, and the background image is accurately generated.

The image surveillance system detects foreground pixels by using an RGB value difference between the background image and a current input image for each respective pixel (operation S305). The image surveillance system sets a target pixel to a foreground pixel F(x, y) when an RGB average value between a current input image and the background image is equal to or greater than a threshold value (e.g., TH1=5) with respect to the target pixel, or when any one of R, G, and B value differences between the background image and the current input image is equal to or greater than a threshold value (TH2=13) with respect to the target pixel. The foreground pixel F(x, y) may be set to have a value of 255, as shown in Equation (2) below.

$$F(x,y)=255, \text{ if } |D_{avg}|>TH1 \text{ or } |D_{R/G/B}|>TH2 \quad (2)$$

The image surveillance system removes shadow pixels from the detected foreground pixels, based on hue and brightness information (operation S307). When a shadow is casted over a background, since an overall darkness is changed, RGB information, such as an RGB value, of a pixel is changed, and the shadow may be detected as the foreground region. Thus, hue and brightness information about each pixel is used to remove the shadow. A background region over which a shadow is cast has similar hue information, but has different brightness information, compared to those of a previous background image, and information about a moving object region has excessively different hue information compared to that of a previous background image. The image surveillance system removes the shadow from the foreground region by using these features according to Equation (3) below.

$$|P_i| = |I_i|\cos\theta = \frac{I_i \cdot E_j}{|E_j|} \rightarrow \text{distance} = |P_i| - |E_j| \rightarrow I_3 = 0 \quad (3)$$

$$\text{if } |\text{distance}| < TH_d \ \& \ \theta < TH_\theta$$

In an RGB coordinate system using the above Equation (3), 'I' (which is different from "I" in Equation (1)) is a pixel vector of an input image, 'E' is a pixel vector of a background image, and 'P' is a projection vector that is projected with respect to E of I. When an absolute value | distance | of a distance difference of P and E is equal to or less than a threshold value $TH_d$, and an angle θ between P and E is equal to or less than a threshold value $TH_\theta$, a corresponding pixel is set to a shadow pixel, and thus, is removed from the foreground pixel. By removing the shadow, a foreground image that is clearer than in a case where the shadow is not removed as shown in FIG. 6B is detected, as shown in FIG. 6C.

The image surveillance system updates the background image (operation S209). The image surveillance system continues to perform the RGB information cumulative counting method for each respective pixel on a target area for a predetermined period of time. The image surveillance system updates the background image with respect to only pixels that continue to be determined to be the background pixels for a predetermined period of time after the foreground pixel is detected, by using a result of the cumulative counting.

Figure 7:
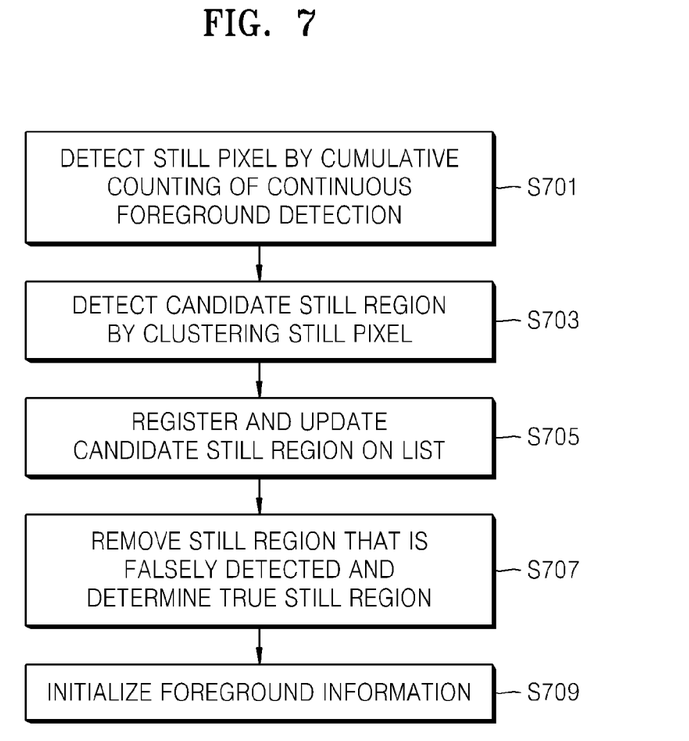
FIG. 7 is a flowchart of a method of detecting a still region, as described with reference to FIG. 1, according to an exemplary embodiment.
Figure 8:
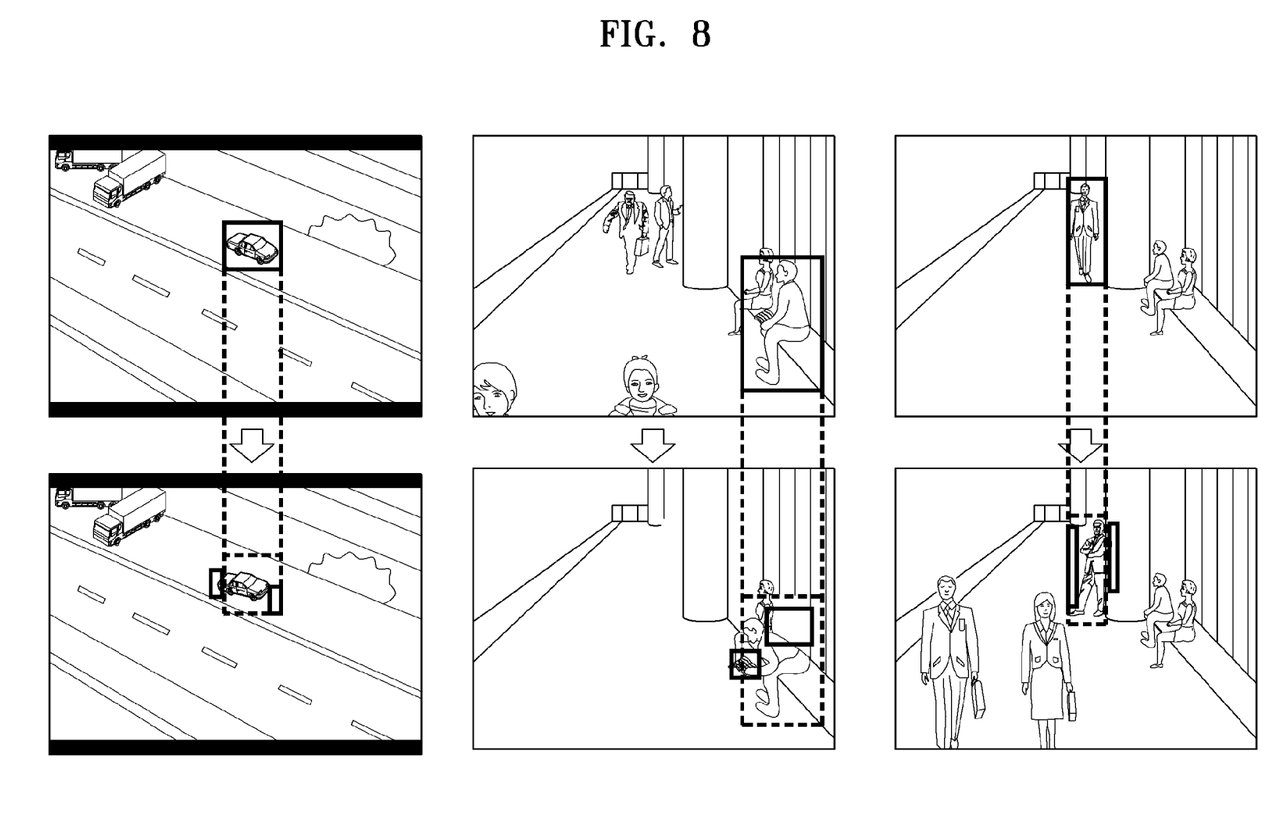
FIG. 8 is a set of images showing secondary motions of candidate still images, according to an exemplary embodiment.
Figure 9:
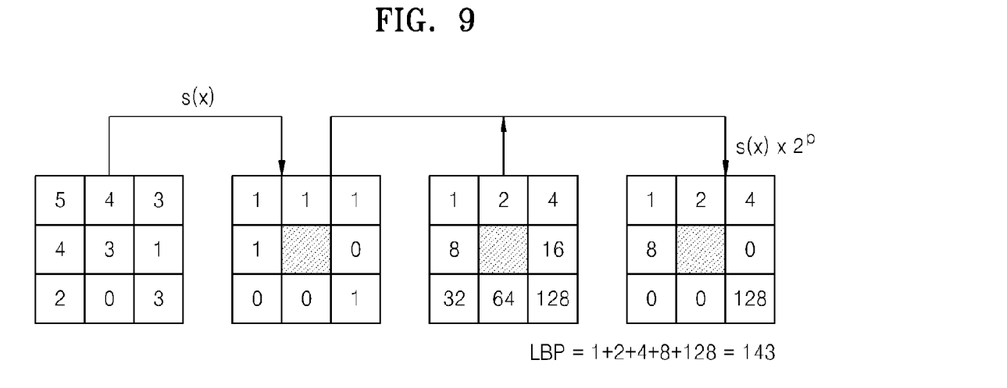
FIG. 9 is a diagram for explaining a local binary pattern (LBP) method, according to an exemplary embodiment.

FIG. 7 is a flowchart of the method of detecting still regions, as described with reference to FIG. 1, according to an exemplary embodiment. FIG. 8 is a set of images showing secondary motions of candidate still regions, according to an exemplary embodiment. FIG. 9 is a diagram for explaining a local binary pattern (LBP) method, according to an exemplary embodiment.

Referring to FIG. 7, the image surveillance system detects, as a candidate still pixel, a pixel that continues to be detected as a foreground pixel for a predetermined period of time or more, for example, for 30 frames or more (operation S701).

The image surveillance system detects candidate still regions (operation S703). The image surveillance system detects a candidate still region by clustering adjacent candidate still pixels. In order to cluster the still pixels, a connected component clustering method may be used. Each of the candidate still regions is displayed as a box including all clustered candidate still pixels on a screen.

The image surveillance system registers information about the detected candidate still regions on a list and updates the list for each respective image frame (operation S705). The information about a candidate still region registered on the list includes (x, y) coordinates of top left and bottom right pixels of the candidate still region, the size of the candidate still region, average RGB information about the candidate still region, average RGB information about a background region corresponding to the candidate still region, and a sustained period of the candidate still region.

Since the image surveillance system detects a candidate still region for each respective image frame, when a candidate still region detected in a current image frame is the same as a candidate still region of a previous image frame, the image surveillance system needs to update information about candidate still regions. Whether the candidate still regions are the same may be determined according to whether a rate, in which boxes of candidate still regions of the previous image frame and the current image frame overlap with each other, is equal to or greater than a predetermined rate, or whether an average RGB values between the candidate still regions is equal to or less than a predetermined value. When it is determined that the candidate still regions are the same, registered information about a candidate still region is updated to information about a candidate still region of the current image frame. Here, the information about the candidate still region is updated only if the size of the candidate still region is increased. This is because it is considered that a moving object stops moving.

The image surveillance system removes a candidate still region that is falsely detected from among the detected candidate still regions, and selects a final still region (operation S707). Thus, only true still regions that are generated by events of taking away or leaving behind an object may be selected from among the candidate still regions.

Conditions for determining whether candidate still regions are falsely detected are as follows.

(1) A Rate of another Foreground Region Surrounding a Candidate still Region

If a rate of another foreground region surrounding a candidate still region is more than a threshold value (e.g., 0.234), determination of whether a candidate still region is falsely detected is withheld, and other conditions are examined until the rate of another foreground region surrounding the candidate still region is less than a predetermined value, in order to prevent selection of the final still region from being affected by a certain moving object when the final still region is covered, that is overlapped, by this moving object. Here, another foreground region surrounding a candidate still region is an area of another foreground region which does not overlap or cover the candidate still region when the candidate still region is surrounded by or included in another foreground region. The rate of the foreground region surrounding the candidate still region may be calculated according to {(Area of region overlapping another foreground region and region other than candidate still region)/(Area of region other than candidate still region)}.

(2) A Stable State of a Foreground Region Corresponding to a Candidate still Region If variance in an area of a foreground region corresponding to a candidate still region is more than a threshold value (e.g., 0.17×area of foreground region), and a variance in a center coordinate of this foreground region is more than a threshold value (e.g., three pixels), it is determined that the candidate still region is falsely detected. This is because when a variance in the center coordinate is more than a predetermined range as the area of the foreground region is changed, an object is not stably placed at a single location or does not disappear. In addition, this condition is defined in consideration of influences of another foreground region in which an object moves around.

(3) A Sustained Time Period of a Candidate still Region

If a candidate still region exists as a candidate for a sustained time period that is more than a threshold value (e.g., 200 frames), the image surveillance system determines that the candidate still region is falsely detected, in order to prevent the candidate still region from being considered existing for a long period as a plurality of falsely-detected still regions accumulate and are combined.

(4) A Size of a Candidate still Region

If a candidate still region is more than a threshold value (e.g., 0.15×image size), the image surveillance system determines that the candidate still region is falsely detected, in order to prevent a plurality of candidate still regions that are falsely detected from being simultaneously detected and being combined.

(5) Whether there is a Secondary Motion of a Candidate still Region

If a secondary motion of a candidate still region is detected, the image surveillance system determines that the candidate still region is falsely detected. For example, as shown in FIG. 8, the secondary motion corresponds to a case where a still vehicle moves by a predetermined distance, a case where a person who sits down or stands up shifts his or her posture, or the like. Within a predetermined period of time after the candidate sill region is generated, when another box is detected in a box of the candidate still region or a rate in which boxes overlap with each other is more than a predetermined value, it is determined that the candidate still region is falsely detected.

According to the above-described embodiment, if it is determined whether a candidate still image is falsely detected, the conditions (1) through (5) are sequentially applied. However, the inventive concept is not limited to this. According to a user or an environment, the order of the conditions may be changed. Also, other conditions complying with the inventive concept may replace the above conditions or may be additionally used to remove falsely detected candidate still regions. For example, the following condition may be additionally used.

(6) Removal of False Detection by Using a Local Binary Pattern (LBP)

The image surveillance system may use the LBP in order to lower a false detection rate in addition to the conditions (1) through 5. The LBP is a method of determining a state of a pixel by using values of adjacent pixels as well as a value of the pixel itself, and thus, is effectively used with respect to a monotonous variance in a gray-scale.

$$LBP(x_c, y_c) = \sum_{p=0}^{P-1} s(g_p - g_c) 2^P \quad s(x) = \begin{cases} 1 & x \geq 0 \\ 0 & x < 0 \end{cases} \quad (4)$$

Here, $g_p$ is an RGB value of a p-th neighborhood pixel and $g_c$ is an RGB value of a central pixel. That is, as shown in FIG. 9, a feature value of the central pixel is determined by calculating a result pattern, which is obtained by comparing of the central pixel value and value of each of eight adjacent pixels, in the form of square of 2, in order to reflect position information about each adjacent pixel to the feature value.

One of the cases where a candidate still region is determined as a true still region although this candidate still region is a falsely detected still region is a case where the candidate still region is determined as the true still region in a list reverse matching process as described below since an overall darkness of a background is changed. In the list reverse matching, since RGB values themselves of respective pixels are compared, a change in an overall darkness may not be detected. Thus, an LBP is used to determine, as a falsely detected candidate still region, a candidate still region whose darkness is changed due to a change in lighting or shadow. In the LBP, since a relative difference in darkness is used in spite of a variance in an overall darkness in a 3×3 mask, influences with respect to a monotonous variance in a gray-scale may be excluded.

(7) List Reverse Matching

The image surveillance system determines whether candidate still regions, from which the falsely detected candidate still region is removed under the conditions (1) through (6), are true still regions. The image surveillance system compares average RGB information about a background region corresponding to a candidate still region stored on a list with average RGB information about the candidate still region, with respect to each respective candidate still region. As a result of the comparison, if an average RGB information difference is less than a threshold value (e.g., 15), the image surveillance system determines that a corresponding still region is a falsely detected still region. In addition, when the average RGB information difference is more than the threshold value, the image surveillance system determines that the candidate still region is a true still region. An RGB value of the true still region may be set to 255.

$$S(x,y)=255 \text{ if } |D_{avg}|>TH| \qquad (5)$$

After the image surveillance system selects the true still region, the image surveillance system initializes foreground information and changes a background image (operation S709). The image surveillance system removes a foreground region corresponding to a true still region and initializes a cumulative counting value for detecting a candidate still region. In addition, the image surveillance system replaces a background image with a current input image so as to prepare to detect another still region, thereby updating a background of pixels that are determined as a foreground region/candidate still region/true still region.

Figure 10:
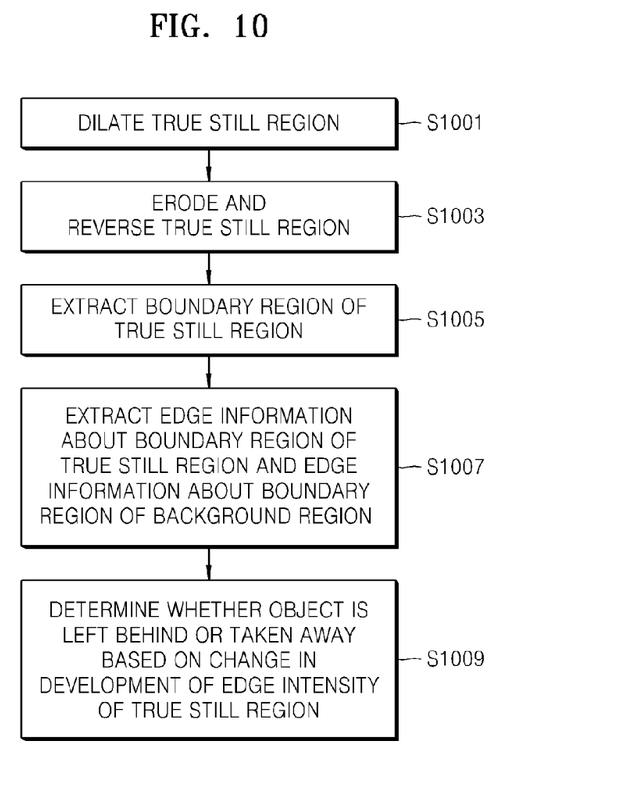
FIG. 10 is a flowchart of the method of FIG. 1 of detecting an object that is left behind or taken away, according to an exemplary embodiment

FIG. 10 is a flowchart of the method of FIG. 1 of detecting an object that is left behind or taken away, according to an exemplary embodiment.

Referring to FIG. 10, the image surveillance system determines whether the object is left behind or taken away by extracting only a boundary region of each true still region, and then, analyzing a change in development of edge information about the boundary region in an input image and a background image.

The image surveillance system dilates the true still region to generate a dilation region (operation S1001).

The image surveillance system erodes and reverses the true still region to generate a reversed erosion region (operation S1003).

The image surveillance system performs an exclusive logic sum (XOR) on the dilation region and the reversed erosion region to extract an XOR region (boundary region) of the true still region (operation S1005).

The image surveillance system extracts edge information about the boundary region of the true still region and edge information about the boundary region of the background region corresponding to the true still region (operation S1007).

The image surveillance system analyzes a change in development of an edge intensity of the true still region to determine whether the object is left behind or taken away (operation S1009). The image surveillance system determines that the object is left behind if the edge information about the true still region of the input image is increased compared to the edge information about the background image. The image surveillance system determines that the object is taken away if the edge information about the true still region of the input image is reduced compared to the edge information about the background image.

FIGS. 11A through 11D are diagrams for explaining the method of FIG. 10 of detecting an object that is left behind or taken away, according to an exemplary embodiment.

Figure 11A:
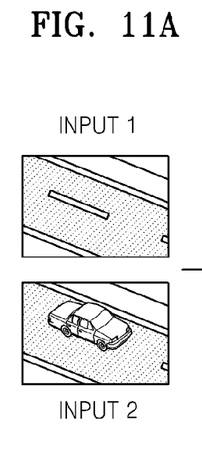
FIGS. 11A through 11D are diagrams for explaining the method of FIG. 10 of detecting an object that is left behind or taken away, according to an exemplary embodiment.
Figure 11B:
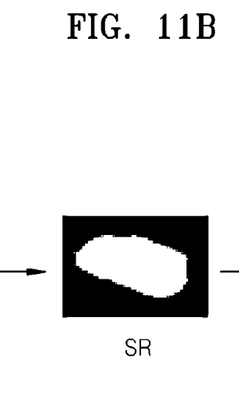
Figure 11C:
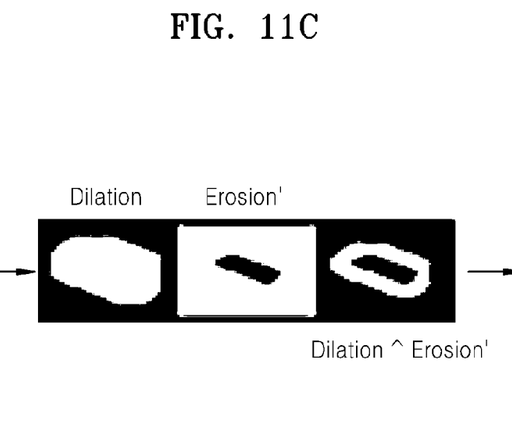
Figure 11D:
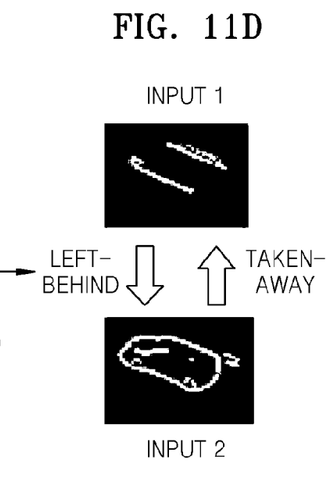

FIG. 11A shows an input image 'INPUT 1' at t0 and an input image 'INPUT 2' at t0+Δt. As shown in FIG. 11C, dilation "Dilation", erosion and reversion "Erosion'", and an XOR calculation of "Dilation ^ Erosion'" are performed on a still region SR detected from the input image 'INPUT 2', which is shown in FIG. 11B. As shown in FIG. 11D, after the XOR calculation, the edge information about the still region SR detected from the input image 'INPUT 2' is increased compared to the edge information about the input image 'INPUT 1', and thus, it is determined that an object of the still region SR is left behind. On the contrary, when the input image 'INPUT 2' is input at t0 and the input image 'INPUT 1' is input at t0+Δt, the edge information about the still region SR detected from the input image 'INPUT 1' is reduced compared to the edge information about the input image 'INPUT 2', and thus, it is determined that the object of the still region SR is taken away.

Figure 12:
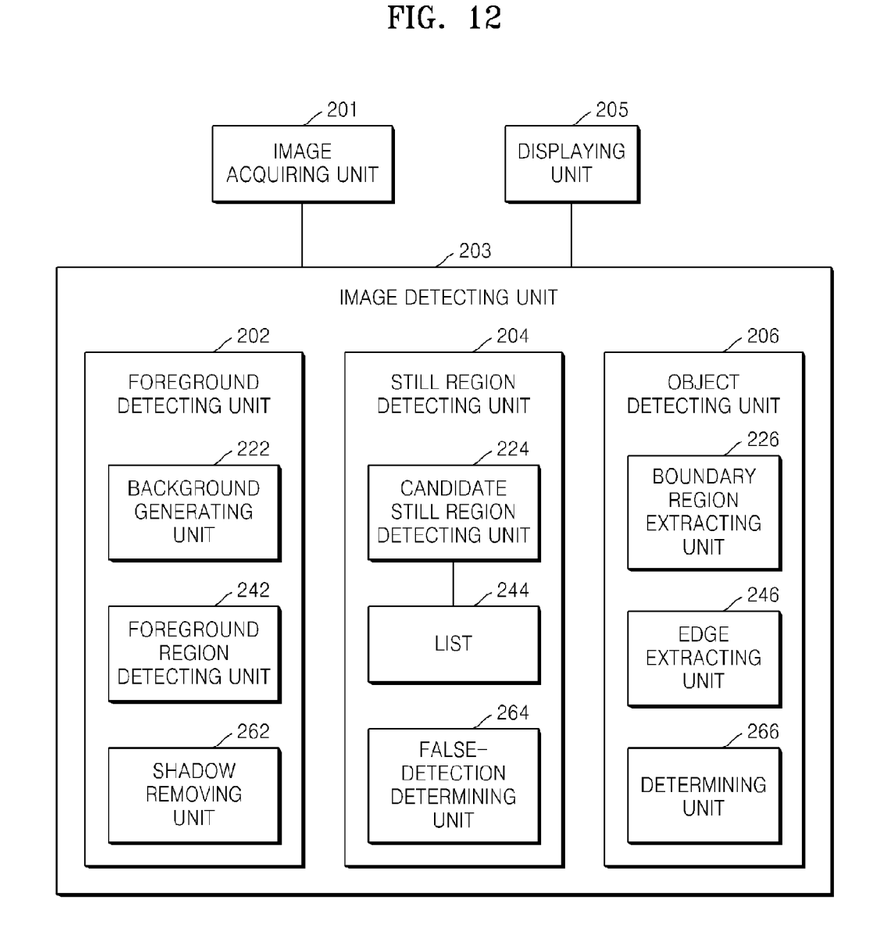
FIG. 12 is a schematic block diagram of an image surveillance system for detecting an object that is left behind or taken away, according to an exemplary embodiment.

FIG. 12 is a schematic block diagram of an image surveillance system for detecting an object that is left behind or taken away, according to an exemplary embodiment. The image surveillance system performs the method of detecting an object that is left behind or taken away, as described with reference to FIGS. 1 through 10. Hereinafter, the detailed description that has been already described with reference to FIGS. 1 through 10 will be omitted.

Referring to FIG. 12, the image surveillance system includes an image acquiring unit 201, an image detecting unit 203, and a displaying unit 205.

The image acquiring unit 201 acquires a real time image signal from at least one imaging device such as a fixed camera.

The image detecting unit 203 processes and analyzes an input image, and detects an event. The image detecting unit 203 includes a foreground detecting unit 202, a still region detecting unit 204, and a detecting unit 206 for detecting an object that is left behind or taken away.

The foreground detecting unit 202 detects a foreground region based on a color information difference between a background image and a current input image. The foreground detecting unit 202 includes a background generating unit 222, a foreground region detecting unit 242, and a shadow removing unit 262.

The background generating unit 222 stores RGB values for respective pixels in a predetermined number of image frames, and generates a background image by using pixels having an RGB value with a highest cumulative frequency number from among the stored RGB values. The background generating unit 222 updates the background image according to a result of the detecting of the foreground region.

The foreground region detecting unit 242 sets, as a foreground pixel, a pixel of which an RGB value difference between a background image and a current input image is equal to or greater than a threshold value.

The shadow removing unit 262 removes a shadow pixel from foreground pixels, based on hue and brightness information.

The still region detecting unit 204 detects candidate still regions by clustering the foreground pixels of the foreground region, and determines whether the candidate still regions are falsely detected to select a true still region. The still region detecting unit 204 includes a candidate still region detecting unit 224, a list 244, and a false-detection determining unit 264.

The candidate still region detecting unit 224 sets, as a still pixel, a pixel that has been detected for a predetermined period of time as a foreground pixel, clusters the set still pixels to detect the set still pixels as a candidate still region, and registers information about the candidate still region in the list 244. The information about the candidate still region includes coordinates of top left and bottom right pixels of the candidate still region, the size of the candidate still region, average RGB information about the candidate still region, average RGB information about a background region corresponding to the candidate still region, and a sustained period of the candidate still region. When a candidate still region of a current input image is the same as a candidate still region of a previous input image, candidate still region information stored on the list 244 is updated to candidate still region information about the current input image.

The false-detection determining unit 264 applies conditions for determining whether candidate still regions are falsely detected to the candidate still regions to remove candidate still regions that are falsely detected. The conditions for determining whether candidate still regions are falsely detected includes a rate of another foreground region surrounding a candidate still region, a stable state of a foreground region corresponding to a candidate still region, a sustained period of a candidate still region, a size of a candidate still region, and whether there is a secondary motion of a candidate still region. The order of the conditions may be changed The false-detection determining unit 264 may also apply an LBP to the candidate still region remained after the falsely detected still region is removed to further remove a falsely detected still region according to a change in darkness. In addition, the false-detection determining unit 264 performs list reverse matching on the candidate still region remained after the falsely detected still region is removed according to a change in darkness to further remove a falsely detected still region. The list reverse matching is a process of comparing an average RGB value of a candidate still region of the list 244 and an average RGB value of a background region corresponding to the candidate still region. In this case, when a difference in the average RGB values is equal to or greater than a threshold value, the candidate still region is selected as a true still region.

Information about the falsely detected still region is removed from the list 244.

The detecting unit 206 determines whether an object is left behind or taken away based on the true still region. The detecting unit 206 includes a boundary region extracting unit 226, an edge extracting unit 246, and a determining unit 266 for detecting an object that is left behind or taken away.

The boundary region extracting unit 226 performs an XOR calculation on a dilation region generated by dilating the true still region and a reversed erosion region generated by eroding and reversing the true still region to extract a boundary region of the true still region.

The edge extracting unit 246 extracts edge information about a boundary region of the true still region and edge information about a boundary region of a background image corresponding to the true still region.

The determining unit 266 detects whether an object is left behind or taken away based on a change between an edge intensity of the true still region and an edge intensity of the background image corresponding to the true still region, and displays blocks having a box shape. When the edge intensity of the true still region increases compared to the edge intensity of the background image corresponding to the true still region, the determining unit 266 determines that the object is left behind. When the edge intensity of the true still region decreases compared to the edge intensity of the background image corresponding to the true still region, the determining unit 266 determines that the object is taken away. When the determining unit 266 determines that the object is taken away, after a predetermined period of time elapses, the determining unit 266 releases a block for displaying a still region in which an object is detected as being taken away, and removes information related to the still region from the list 244. In addition, when the determining unit 266 determines that the object is left behind, the determining unit 266 compares a background image and an input image after a predetermined period of time elapses. When there is no change, the determining unit 266 continues to display the block. Then, after a predetermined period of time elapses again, the determining unit 266 releases a block for displaying a still region in which an object is detected to be left behind, and removes information related to the still region from the list 244.

The displaying unit 205 may display a target image and may raise alarms when an event of taking away or leaving behind an object occurs. The displaying unit 205 may include a liquid crystal display (LCD) panel, an organic light-emitting display panel, an electrophoretic display panel, and the like.

According to one or more exemplary embodiments, the method of detecting an object may be used to automatically detect a suspicious object (e.g., an explosive device) in public facilities, such as an airport or a subway, and may be used in an automation system for curbing illegal trash dumping or illegal parking. In addition, the method may be used in an automation anti-theft system for protecting exhibits or products in an art museum, an exhibition center, a jeweler's shop, or the like.

A system and method according to the above exemplary embodiments may extract detailed information related to an object that is left behind or taken away in a complex environment where there are a plurality of moving objects, thereby obtaining stable performance for automatically detecting the object that is left behind or taken away.

While the inventive concept has been particularly shown and described with reference to exemplary embodiments thereof, it will be understood by those of ordinary skill in the art that various changes in form and details may be made therein without departing from the spirit and scope as defined by the following claims.

What is claimed is:

1. An image surveillance system comprising:
   an image acquiring unit which receives a current input image; and
   an image detecting unit which receives and processes the current input image, and comprises:
   a foreground detecting unit which detects a foreground region based on a difference between pixel information about a background image and pixel information about the current input image;
   a still region detecting unit which detects a candidate still region by clustering foreground pixels of the foreground region and determines whether the candidate still region is a falsely detected still region or a true still region by using information about the candidate still region; and an object detecting unit which determines whether an object is left behind or taken away, based on edge information about the true still region, wherein the object detecting unit determines that the object is left behind if an edge intensity of the true still region in the current input image increases compared to an edge intensity of the background image in a previous input image, and wherein a determining unit determines that the object is taken away if the edge intensity of the true still region in the current input image decreases compared to the edge intensity of the background image in the previous input image.

2. The image surveillance system of claim 1, wherein the foreground detecting unit comprises:

a background generating unit which obtains and stores pixel values of respective pixels in a predetermined number of image frames, generates the background image by using a pixel value which is obtained most frequently with respect to each of the pixels from among the stored pixel values;

a foreground region detecting unit which determines, as one of the foreground pixels, a pixel of which a pixel value difference between the background image and the current input image is equal to or greater than a first threshold value; and a shadow removing unit which removes a shadow pixel from the foreground pixels, based on hue and brightness information about the foreground pixels.

3. The image surveillance system of claim 1, wherein the still region detecting unit comprises:

a candidate still region detecting unit which sets, as one of still pixels, a pixel which is detected as the foreground pixel for a predetermined period of time, and clusters the still pixels to detect the candidate still region; and a false-detection determining unit which determines whether the candidate still region satisfies at least one of a plurality of conditions for determining whether the candidate still region is falsely detected, wherein the plurality of conditions use at least one of an area of another foreground region with respect to an area of the candidate still region, variance of the area of the foreground region in the predetermined period of time, variance in a coordinate of the foreground region, the sustained time period for which the candidate still region is detected as the candidate still region, the size of the candidate still region, a motion of the candidate still region, darkness change of the candidate still region, and a relationship between the average pixel value of the candidate still region and the average pixel value of the background region of the background image corresponding to the candidate still region, and wherein the still region detecting unit determines the candidate still region as the true still region if the candidate still region satisfies at least one of the plurality of conditions.

4. The image surveillance system of claim 3, wherein the information about the candidate still region comprises coordinates of top left and bottom right pixels of the candidate still region, the size of the candidate still region, the average pixel value of the candidate still region, the average pixel value of the background region corresponding to the candidate still region, and the sustained time period for which the candidate still region is detected as the candidate still region, and wherein the information about the candidate still region of the current input image is updated based on information about a candidate still region of a previous input image.

5. The image surveillance system of claim 3, wherein the determining unit comprises:

a boundary region extracting unit which performs an exclusive logic sum (XOR) calculation on a dilation region generated by dilating the true still region and a reversed erosion region generated by eroding and reversing the true still region to extract a boundary region of the true still region in the current input image;

an edge extracting unit which extracts edge information about the boundary region of the true still region in the current input image and edge information about a boundary region of the background image in a previous input image; and a determining unit which determines whether the object is left behind or taken away based on a change between an edge intensity of the true still region in the current input image and an edge intensity of the background image in the previous input image.

6. The image surveillance system of claim 1, wherein the still region detecting unit comprises:

a candidate still region detecting unit which sets, as one of still pixels, a pixel which is detected for a predetermined period of time as the foreground pixel, and clusters the still pixels to detect the candidate still region; and a false-detection determining unit which determines whether the candidate still region satisfies a plurality of conditions for determining whether the candidate still region is falsely detected, wherein the plurality of conditions use an area of another foreground region with respect to an area of the candidate still region, variance of the area of the foreground region in the predetermined period of time, variance in a coordinate of the foreground region, a sustained time period for which the candidate still region is detected as the candidate still region, the size of the candidate still region, a motion of the candidate still region, darkness change of the candidate still region, and a relationship between an average pixel value of the candidate still region and an average pixel value of a background region of the background image corresponding to the candidate still region, respectively, and wherein the still region detecting unit determines the candidate still region as the true still region if the candidate still region satisfies all of the plurality of conditions.

7. The image surveillance system of claim 6, wherein, if a difference in the average pixel values between the candidate still region and the background region is equal to or greater than a second threshold value, the candidate still region is determined as the true still region.

8. The image surveillance system of claim 1, wherein the object detecting unit comprises:

a boundary region extracting unit which performs an exclusive logic sum (XOR) calculation on a dilation region generated by dilating the true still region and a reversed erosion region generated by eroding and reversing the true still region to extract a boundary region of the true still region in the current input image;

an edge extracting unit which extracts edge information about the boundary region of the true still region in the current input image and edge information about a boundary region of the background image in a previous input image; and a determining unit which detects whether the object is left behind or taken away based on a change between an edge intensity of the true still region in the current input image and an edge intensity of the background image in the previous input image.

9. An image surveillance system comprising:
a image acquiring unit which receives a current input image; and
an image detecting unit which receives and processes the current input image, and comprises:
a foreground detecting unit which detects a plurality of foreground regions based on difference between pixel information about a background image and pixel information about a current input image;
a still region detecting unit which detects a plurality of candidate still regions from among the plurality of foreground regions and selects a true still region by removing a falsely detected still region, from among the plurality of candidate still regions by using information about the candidate still region; and
an object detecting unit which determines whether an object corresponding to the true still region is an object which is left behind or taken away, based on edge information about the true still region,
wherein the object detecting unit determines that the object is left behind if an edge intensity of the true still region in the current input image increases compared to an edge intensity of the background image in a previous input image, and
wherein a determining unit determines that the object is taken away if the edge intensity of the true still region in the current input image decreases compared to the edge intensity of the background image in the previous input image.

10. The image surveillance system of claim 9, wherein the still region detecting unit comprises:
a candidate still region detecting unit which sets, as one of still pixels, a pixel which is detected for a predetermined period of time as a foreground pixel of the foreground regions, and clusters the still pixels to detect the plurality of candidate still regions; and
a false-detection determining unit which determines whether the plurality of candidate still regions are falsely detected, based on at least one of a plurality of conditions which uses an area of each of the foreground regions with respect to an area of each of the candidate still regions, variance of each of the area of the foreground regions in the predetermined period of time, variance in a coordinate of each of the foreground regions, the sustained time period for which each of the candidate still regions is detected as the candidate still region, the size of each of the candidate still regions, a motion of each of the candidate still regions, darkness change of each of the candidate still regions, and a relationship between the average pixel value of each of the candidate still regions and the average pixel value of the background region of the background image corresponding to each of the candidate still regions, respectively,
wherein the still region detecting unit determines at least one of the candidate still regions as the true still region if at least one candidate still region satisfies the at least one of the plurality of conditions.

11. The image surveillance system of claim 9, wherein the object detecting unit comprises:
a boundary region extracting unit which performs an exclusive logic sum (XOR) calculation on a dilation region generated by dilating the true still region and a reversed erosion region generated by eroding and reversing the true still region to extract a boundary region of the true still region in the current input image;
an edge extracting unit which extracts edge information about the boundary region of the true still region in the current input image and edge information about a boundary region of the background image in a previous input image; and
a determining unit which detects whether the object corresponding to the true still region is left behind or taken away based on a change between an edge intensity of the true still region in the current input image and an edge intensity of the background image in the previous input image.

12. A method of detecting whether an object is left behind or taken away using an image surveillance system, the method comprising:
detecting a foreground region based on difference between pixel information about a background image and pixel information about a current input image;
detecting a candidate still region by clustering foreground pixels of the foreground region and determining whether the candidate still region is a falsely detected still region or a true still region by using information about the candidate still region; and
determining whether an object is left behind or taken away, based on edge information about the true still region,
wherein the determining whether the object is left behind or taken away comprises:
determining that the object is left behind if an edge intensity of the true still region in the current input image increases compared to an edge intensity of the background image in a previous input image; and
determining that the object is taken away if the edge intensity of the true still region in the current input image decreases compared to the edge intensity of the background image in the previous input image.

13. The method of claim 12, wherein the detecting the foreground region comprises:
obtaining and storing pixel values for respective pixels in a predetermined number of image frames, generating the background image by using a pixel value which is obtained most frequently with respect to each of the pixels from among the stored pixel values;
determining, as one of the foreground pixels, a pixel of which a pixel value difference between the background image and the current input image is equal to or greater than a first threshold value; and
removing a shadow pixel from the foreground pixels, based on hue and brightness information about the foreground pixels.

14. The method of claim 12, wherein the determining whether the object is left behind or taken away comprises:
setting, as one of still pixels, a pixel which is detected as the foreground pixel for a predetermined period of time;
clustering the still pixels to detect the candidate still region; and
determining whether the candidate still region satisfies at least one of a plurality of conditions for determining whether the candidate still region is falsely detected,
wherein the plurality of conditions use at least one of an area of the foreground region with respect to an area of the candidate still region, variance of the area of the foreground region in the predetermined period of time, variance in a coordinate of the foreground region, the sustained time period for which the candidate still region is detected as the candidate still region, the size of the candidate still region, a motion of the candidate still region, darkness change of the candidate still region, and a relationship between the average pixel value of the candidate still region and the average pixel value of the background region of the background image corresponding to the candidate still region, and wherein the candidate still region is determined as the true still region if the candidate still region satisfies at least one of the plurality of conditions.

15. The method of claim 14, wherein the information about the candidate still region comprises coordinates of top left and bottom right pixels of the candidate still region, the size of the candidate still region, the average pixel value of the candidate still region, the average pixel value of the background region corresponding to the candidate still region, and the sustained time period for which the candidate still region is detected as the candidate still region, and wherein the information about the candidate still region of the current input image is updated based on a information about a candidate still region of a previous input image.

16. The method of claim 14, wherein, if a difference in the average pixel values between the candidate still region and the background region is equal to or greater than a second threshold value, the candidate still region is determined as the true still region.

17. The method of claim 12, wherein the determining whether the object is left behind or taken away comprises:

performing an exclusive logic sum (XOR) calculation on a dilation region generated by dilating the true still region and a reversed erosion region generated by eroding and reversing the true still region to extract a boundary region of the true still region;

extracting edge information about the boundary region of the true still region in the current image and edge information about a boundary region of the background image in a previous input image; and detecting whether the object is left behind or taken away based on a change between an edge intensity of the true still region in the current input image and an edge intensity of the background image in the previous input image.

18. A non-transitory computer readable recording medium recording the method of claim 12.

\* \* \* \* \*